(12) United States Patent
Robinson et al.

(10) Patent No.: US 9,034,061 B2
(45) Date of Patent: *May 19, 2015

(54) AGGLOMERATED PARTICULATE LOW-RANK COAL FEEDSTOCK AND USES THEREOF

(71) Applicant: GreatPoint Energy, Inc., Cambridge, MA (US)

(72) Inventors: Earl T. Robinson, Lakeland, FL (US); Kenneth P. Keckler, Naperville, IL (US); Pattabhi K. Raman, Kildeer, IL (US); Avinash Sirdeshpande, Chicago, IL (US)

(73) Assignee: GreatPoint Energy, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/039,321

(22) Filed: Sep. 27, 2013

(65) Prior Publication Data

US 2014/0091258 A1    Apr. 3, 2014

Related U.S. Application Data

(60) Provisional application No. 61/708,104, filed on Oct. 1, 2012, provisional application No. 61/775,771, filed on Mar. 11, 2013.

(51) Int. Cl.
*F23L 7/00*    (2006.01)
*C10L 5/04*    (2006.01)
(Continued)

(52) U.S. Cl.
CPC . *F23L 7/007* (2013.01); *C10L 5/04* (2013.01); *C10J 3/72* (2013.01); *F23K 1/00* (2013.01); *C10L 5/10* (2013.01); *C10L 5/363* (2013.01)

(58) Field of Classification Search
CPC .............. C10L 5/04; C10J 3/72; F23L 7/007; F23K 1/00
USPC ............................ 44/550, 592, 593, 595, 596
See application file for complete search history.

(56) References Cited

U.S. PATENT DOCUMENTS 2,605,215 A    7/1952   Coghlan
2,694,923 A    11/1954  Welty, Jr. et al.
(Continued)

FOREIGN PATENT DOCUMENTS

CA    966660    4/1975
CA    1003217   1/1977
(Continued)

OTHER PUBLICATIONS

U.S. Appl. No. 12/778,538, filed May 12, 2010, Robinson, et al.
(Continued)

*Primary Examiner* — Cephia D Toomer
(74) *Attorney, Agent, or Firm* — McDonnell Boehnen Hulbert & Berghoff LLP

(57) ABSTRACT

The present invention relates generally to processes for preparing agglomerated particulate low-rank coal feedstocks of a particle size suitable for reaction in a fluidized-bed reactor and certain other gasification reactors and, in particular, for coal gasification and combustion applications. The present invention also relates to integrated coal gasification and combustion processes including preparing and utilizing such agglomerated particulate low-rank coal feedstocks.

27 Claims, 3 Drawing Sheets

(51) Int. Cl.
  *C10J 3/72* (2006.01)
  *F23K 1/00* (2006.01)
  *C10L 5/36* (2006.01)
  *C10L 5/10* (2006.01)

(56) References Cited

U.S. PATENT DOCUMENTS

| | | |
|---|---|---|
| 2,791,549 A | 5/1957 | Jahnig |
| 2,813,126 A | 11/1957 | Tierney |
| 2,860,959 A | 11/1958 | Pettyjohn, et al. |
| 2,886,405 A | 5/1959 | Benson et al. |
| 3,034,848 A | 5/1962 | King |
| 3,114,930 A | 12/1963 | Oldham et al. |
| 3,150,716 A | 9/1964 | Strelzoff et al. |
| 3,164,330 A | 1/1965 | Neidl |
| 3,351,563 A | 11/1967 | Negra et al. |
| 3,435,590 A | 4/1969 | Smith |
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A | 10/1976 | Kalina et al. |
| 3,989,811 A | 11/1976 | Hill |
| 3,996,014 A | 12/1976 | Muller et al. |
| 3,998,607 A | 12/1976 | Wesswlhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovish et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,192,652 A * | 3/1980 | Smith ............... 44/566 |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,223,728 A | 9/1980 | Pegg |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,341,531 A | 7/1982 | Duranleau et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Calvin et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,385,905 A | 5/1983 | Tucker |
| 4,397,656 A | 8/1983 | Ketkar |
| 4,400,182 A | 8/1983 | Davies et al. |
| 4,407,206 A | 10/1983 | Bartok et al. |
| 4,412,840 A * | 11/1983 | Goksel ............... 44/569 |
| 4,428,535 A | 1/1984 | Venetucci |
| 4,432,773 A | 2/1984 | Euker, Jr. et al. |
| 4,433,065 A | 2/1984 | Van Der Burgt et al. |
| 4,436,028 A | 3/1984 | Wilder |
| 4,436,531 A | 3/1984 | Estabrook et al. |
| 4,439,210 A | 3/1984 | Lancet |
| 4,443,415 A | 4/1984 | Queneau et al. |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |

(56) References Cited

U.S. PATENT DOCUMENTS

| | | |
|---|---|---|
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,696,678 A | 9/1987 | Koyama et al. |
| 4,699,632 A | 10/1987 | Babu et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,074,357 A | 12/1991 | Haines |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,225,044 A | 7/1993 | Breu |
| 5,236,557 A | 8/1993 | Muller et al. |
| 5,250,083 A | 10/1993 | Wolfenbarger et al. |
| 5,277,884 A | 1/1994 | Shinnar et al. |
| 5,388,645 A | 2/1995 | Puri et al. |
| 5,388,650 A | 2/1995 | Michael |
| 5,435,940 A | 7/1995 | Doering et al. |
| 5,536,893 A | 7/1996 | Gudmundsson |
| 5,566,755 A | 10/1996 | Seidle et al. |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,669,960 A | 9/1997 | Couche |
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,032,737 A | 3/2000 | Brady et al. |
| 6,090,356 A | 7/2000 | Jahnke et al. |
| 6,119,778 A | 9/2000 | Seidle et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,419,888 B1 | 7/2002 | Wyckoff |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,830,597 B1 | 12/2004 | Green |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,077,202 B2 | 7/2006 | Shaw et al. |
| 7,100,692 B2 | 9/2006 | Parsley et al. |
| 7,118,720 B1 | 10/2006 | Mendelsohn et al. |
| 7,132,183 B2 | 11/2006 | Galloway |
| 7,168,488 B2 | 1/2007 | Olsvik et al. |
| 7,205,448 B2 | 4/2007 | Gajda et al. |
| 7,220,502 B2 | 5/2007 | Galloway |
| 7,299,868 B2 | 11/2007 | Zapadinski |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,677,309 B2 | 3/2010 | Shaw et al. |
| 7,758,663 B2 | 7/2010 | Rabovitser et al. |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 8,114,176 B2 | 2/2012 | Nahas |
| 8,114,177 B2 | 2/2012 | Hippo et al. |
| 8,123,827 B2 | 2/2012 | Robinson |
| 8,163,048 B2 | 4/2012 | Rappas et al. |
| 8,192,716 B2 | 6/2012 | Raman et al. |
| 8,202,913 B2 | 6/2012 | Robinson et al. |
| 8,268,899 B2 | 9/2012 | Robinson et al. |
| 8,286,901 B2 | 10/2012 | Rappas et al. |
| 8,297,542 B2 | 10/2012 | Rappas et al. |
| 8,328,890 B2 | 12/2012 | Reiling et al. |
| 8,349,037 B2 | 1/2013 | Steiner et al. |
| 8,349,039 B2 | 1/2013 | Robinson |
| 8,361,428 B2 | 1/2013 | Raman et al. |
| 8,366,795 B2 | 2/2013 | Raman et al. |
| 8,479,833 B2 | 7/2013 | Raman |
| 8,479,834 B2 | 7/2013 | Preston |
| 8,502,007 B2 | 8/2013 | Hippo et al. |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0023086 A1 | 2/2004 | Su et al. |
| 2004/0123601 A1 | 7/2004 | Fan |
| 2004/0180971 A1 | 9/2004 | Inoue et al. |
| 2004/0256116 A1 | 12/2004 | Olsvik et al. |
| 2005/0107648 A1 | 5/2005 | Kimura et al. |
| 2005/0137442 A1 | 6/2005 | Gajda et al. |
| 2005/0192362 A1 | 9/2005 | Rodriguez et al. |
| 2005/0287056 A1 | 12/2005 | Baker et al. |
| 2005/0288537 A1 | 12/2005 | Maund et al. |
| 2006/0149423 A1 | 7/2006 | Barnicki et al. |
| 2006/0228290 A1 | 10/2006 | Green |
| 2006/0231252 A1 | 10/2006 | Shaw et al. |
| 2006/0265953 A1 | 11/2006 | Hobbs |
| 2006/0272813 A1 | 12/2006 | Olsvik et al. |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovitser et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2008/0022586 A1* | 1/2008 | Gilbert et al. .......... 44/490 |
| 2008/0141591 A1 | 6/2008 | Kohl |

(56) References Cited

U.S. PATENT DOCUMENTS

| | | |
|---|---|---|
| 2008/0289822 A1 | 11/2008 | Betzer Tsilevich |
| 2009/0012188 A1 | 1/2009 | Rojey et al. |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0235585 A1 | 9/2009 | Neels et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0305093 A1 | 12/2009 | Biollaz et al. |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0018113 A1 | 1/2010 | Bohlig et al. |
| 2010/0050654 A1 | 3/2010 | Chiu et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0159352 A1 | 6/2010 | Gelin et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2011/0294905 A1 | 12/2011 | Robinson et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |
| 2012/0213680 A1 | 8/2012 | Rappas et al. |
| 2012/0271072 A1 | 10/2012 | Robinson et al. |
| 2012/0305848 A1 | 12/2012 | Sirdeshpande |
| 2013/0042824 A1 | 2/2013 | Sirdeshpande |
| 2013/0046124 A1 | 2/2013 | Sirdeshpande |
| 2013/0172640 A1 | 7/2013 | Robinson et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 1282243 | 4/1991 |
| CA | 1299589 | 4/1992 |
| CA | 1332108 | 9/1994 |
| CA | 2673121 | 6/2008 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 819 | 4/2000 |
| EP | 1001002 | 5/2000 |
| EP | 1004746 | 5/2000 |
| EP | 1136542 | 9/2001 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 03-115491 | 5/1991 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 | 6/2006 |
| WO | 00/18681 | 4/2000 |
| WO | 00/43468 | 7/2000 |

(56) References Cited

FOREIGN PATENT DOCUMENTS

| | | |
|---|---|---|
| WO | 02/40768 | 5/2002 |
| WO | 02/079355 | 10/2002 |
| WO | 02/103157 | 12/2002 |
| WO | 03/018958 | 3/2003 |
| WO | 03/033624 | 4/2003 |
| WO | 2004/055323 | 7/2004 |
| WO | 2004/072210 | 8/2004 |
| WO | 2006/031011 | 3/2006 |
| WO | 2007/005284 | 1/2007 |
| WO | 2007/047210 | 4/2007 |
| WO | 2007/068682 | 6/2007 |
| WO | 2007/076363 | 7/2007 |
| WO | 2007/077137 | 7/2007 |
| WO | 2007/077138 | 7/2007 |
| WO | 2007/083072 | 7/2007 |
| WO | 2007/128370 | 11/2007 |
| WO | 2007/143376 | 12/2007 |
| WO | 2008/058636 | 5/2008 |
| WO | 2008/073889 | 6/2008 |
| WO | 2008/087154 | 7/2008 |
| WO | 2009/018053 | 2/2009 |
| WO | 2009/048723 | 4/2009 |
| WO | 2009/048724 | 4/2009 |
| WO | 2009/086361 | 7/2009 |
| WO | 2009/086362 | 7/2009 |
| WO | 2009/086363 | 7/2009 |
| WO | 2009/086366 | 7/2009 |
| WO | 2009/086367 | 7/2009 |
| WO | 2009/086370 | 7/2009 |
| WO | 2009/086372 | 7/2009 |
| WO | 2009/086374 | 7/2009 |
| WO | 2009/086377 | 7/2009 |
| WO | 2009/086383 | 7/2009 |
| WO | 2009/086407 | 7/2009 |
| WO | 2009/086408 | 7/2009 |
| WO | 2009/111330 | 9/2009 |
| WO | 2009/111331 | 9/2009 |
| WO | 2009/111332 | 9/2009 |
| WO | 2009/111335 | 9/2009 |
| WO | 2009/111342 | 9/2009 |
| WO | 2009/111345 | 9/2009 |
| WO | 2009/124017 | 10/2009 |
| WO | 2009/124019 | 10/2009 |
| WO | 2009/158576 | 12/2009 |
| WO | 2009/158578 | 12/2009 |
| WO | 2009/158580 | 12/2009 |
| WO | 2009/158582 | 12/2009 |
| WO | 2009/158583 | 12/2009 |
| WO | 2010/033846 | 3/2010 |
| WO | 2010/033848 | 3/2010 |
| WO | 2010/033850 | 3/2010 |
| WO | 2010/033852 | 3/2010 |
| WO | 2010/048493 | 4/2010 |
| WO | 2010/078297 | 7/2010 |
| WO | 2010/078298 | 7/2010 |
| WO | 2010/132549 | 11/2010 |
| WO | 2010/132551 | 11/2010 |
| WO | 2011/017630 | 2/2011 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | 2011/034888 | 3/2011 |
| WO | 2011/034889 | 3/2011 |
| WO | 2011/034890 | 3/2011 |
| WO | 2011/034891 | 3/2011 |
| WO | 2011/049858 | 4/2011 |
| WO | 2011/049861 | 4/2011 |
| WO | 2011/063608 | 6/2011 |
| WO | 2011/084580 | 7/2011 |
| WO | 2011/084581 | 7/2011 |
| WO | 2011/106285 | 9/2011 |
| WO | 2011/139694 | 11/2011 |
| WO | 2011/150217 | 12/2011 |
| WO | 2012/024369 | 2/2012 |
| WO | 2012/033997 | 3/2012 |
| WO | 2012/061235 | 5/2012 |
| WO | 2012/061238 | 5/2012 |
| WO | 2012/116003 | 8/2012 |
| WO | 2012/145497 | 10/2012 |
| WO | 2012/166879 | 12/2012 |
| WO | 2013/025808 | 2/2013 |
| WO | 2013/025812 | 2/2013 |
| WO | 2013/052553 | 4/2013 |

OTHER PUBLICATIONS

U.S. Appl. No. 12/778,548, filed May 12, 2010, Robinson, et al.
U.S. Appl. No. 12/778,552, filed May 12, 2010, Robinson, et al.
Asami, K., et al., "Highly Active Iron Catalysts from Ferric Chloride or the Steam Gasification of Brown Coal," ind. Eng. Chem. Res., vol. 32, No. 8, 1993, pp. 1631-1636.
Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.
Brown et al., "Biomass-Derived Hydrogen From a Thermally Ballasted Gasifier," Aug. 2005.
Brown et al., "Biomass-Derived Hydrogen From a Thermally Ballasted Gasifier," DOE Hydrogen Program Contractors' Review Metting, Center for Sustainable Environmental Technologies, Iowa State University, May 21, 2003.
Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.
Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.
Kalina, T., Nahas, N.C., Project Managers, "Exxon Catalaytic Coal Gasification Process Predevelopment Program," Exxon Research & Engineering Company, FE-2369-24, U.S. Dept. of Energy, Contract No. E(49-18)-2369, 1978.
Nahas, N.C., "Exxon Catalytic Coal Gasification Process—Fundamentals to Flowsheets," Fuel, vol. 62, No. 2, 1983, pp. 239-241.
Ohtsuka, Y. et al., "Highly Active Catalysts from Inexpensive Raw Materials for Coal Gasification," Catalysis Today, vol. 39, 1997, pp. 111-125.
Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.
Ohtsuka, Yasuo et al., "Calcium Catalysed Steam Gasification of Yalourn Brown Coal," Fuel, vol. 65, 1986, pp. 1653-1657.
Ohtsuka, Yasuo, et al, "Iron-Catalyzed Gasification of Brown Coal at Low Temperatures," Energy & Fuels, vol. 1, No. 1, 1987, pp. 32-36.
Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.
Ohtsuka, Yasuo et al., "Steam Gasification of Coals with Calcium Hydroxide," Energy & Fuels, vol. 9, No. 6, 1995, pp. 1038-1042.
Pereira, P., et al., "Catalytic Steam Gasification of Coals," Energy & Fuels, vol. 6, No. 4, 1992, pp. 407-410.
Ruan Xiang-Quan, et al., "Effects of Catalysis on Gasification of Tatong Coal Char," Fuel, vol. 66, Apr. 1987, pp. 568-571.
Tandon, D., "Low Temperature and Elevated Pressure Steam Gasification of Illinois Coal," College of Engineering in the Graduate School, Southern Illinois university at Carbondale, Jun. 1996.
Adsorption, http://en.wikipedia.org/wiki/Adsorption, pp. 1-8 (Oct. 17, 2007).
Amine gas treating, http://en.wikipedia.org/wiki/Acid_gas_removal, pp. 1-4 (Oct. 21, 2007).
Coal, http://en.wikipedia.org/wiki/Coal_gasification, pp. 1-8 (Oct. 29, 2007).
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.

(56) References Cited

OTHER PUBLICATIONS

Demibras, "Demineralization of Agricultural Residues by Water Leaching", *Energy Sources*, vol. 25, pp. 679-687, (2003).

Fluidized Bed Gasifiers, http://www.energyproducts.com/fluidized_bed_gasifiers.htm, Oct. 2007, pp. 1-5.

Gas separation, http://en.wikipedia.org/wiki/Gas_separation, pp. 1-2 (Feb. 24, 2007).

Gasification, http://en.wikipedia.org/wiki/Gasification, pp. 1-6 (Oct. 29, 2007).

Gallagher Jr., et al., "Catalytic Coal Gasification for SNG Manufacture", *Energy Research*, vol. 4, pp. 137-147, (1980).

Heinemann, et al., "Fundamental and Exploratory Studies of Catalytic Steam Gasification of Carbonaceous Materials", Final Report Fiscal Years 1985-1994.

Jensen, et al. Removal of K and Cl by leaching of straw char, *Biomass and Bioenergy*, vol. 20, pp. 447-457, (2001).

Mengjie, et al., "A potential renewable energy resource development and utilization of biomass energy", http://www.fao.org.docrep/T4470E/t4470e0n.htm, pp. 1-8 (1994).

Meyers, et al. Fly Ash as a Construction Material for Highways, A Manual. Federal Highway Administration, Report No. FHWA-IP-76-16, Washington, DC, 1976.

Moulton, Lyle K. "Bottom Ash and Boiler Slag", *Proceedings of the Third International Ash Utilization Symposium*, U.S. Bureau of Mines, Information Circular No. 8640, Washington, DC, 1973.

Natural gas processing, http://en.wikipedia.org/wiki/Natural_gas_processing, pp. 1-4 (Oct. 22, 2007).

Natural Gas Processing: The Crucial Link Between Natural Gas Production and Its Transportation to Market. Energy Information Administration, Office of Oil and Gas; pp. 1-11, (2006).

Prins, et al., "Exergetic optimisation of a production process of Fischer-Tropsch fuels from biomass", *Fuel Processing Technology*, vol. 86, pp. 375-389, (2004).

Reboiler, http://en.wikipedia.org/wiki/Reboiler, pp. 1-4 (Nov. 11, 2007).

What is XPS?, http://www.nuance.northwestern.edu/Keckll/xps1.asp, 2006, pp. 1-2 (2006).

2.3 Types of gasifiers, http://www.fao.org/docrep/t0512e/T0512e0a.htm, pp. 1-6 (1986).

2.4 Gasification fuels, http://www.fao.org/docrep/t0512e/T0512e0b.htm#TopofPage, pp. 1-8 (1986).

2.5 Design of downdraught gasifiers, http://www.fao.org/docrep/t0512e/T0512e0c.htm#TopOfPage, pp. 1-8 (1986).

2.6 Gas cleaning and cooling, http://www.fao.org/docrep/t0512e0d.htm#TopOFPate, pp. 1-3 (1986).

A.G. Collot et al., "Co-pyrolysis and co-gasification of coal and biomass in bench-scale fixed-bed and fluidized bed reactors", (1999) Fuel 78, pp. 667-679.

Wenkui Zhu et al., "Catalytic gasification of char from co-pyrolysis of coal and biomass", (2008) Fuel Processing Technology, vol. 89, pp. 890-896.

Chiesa P. et al., "Co-Production of hydrogen, electricity and CO2 from coal with commercially ready technology. Part A: Performance and emissions", (2005) International Journal of Hydrogen Energy, vol. 30, No. 7, pp. 747-767.

Chiaramonte et al, "Upgrade Coke by Gasification", (1982) Hydrocarbon Processing, vol. 61 (9), pp. 255-257 (Abstract only).

Gerdes, Kristin, et al., "Integrated Gasification Fuel Cell Performance and Cost Assessment," National Energy Technology Laboratory, U.S. Department of Energy, Mar. 27, 2009, pp. 1-26.

Ghosh, S., et al., "Energy Analysis of a Cogeneration Plant Using Coal Gasification and Solid Oxide Fuel Cell," Energy, 2006, vol. 31, No. 2-3, pp. 345-363.

Jeon, S.K., et al., "Characteristics of Steam Hydrogasification of Wood Using a Micro-Batch Reactor," Fuel, 2007, vol. 86, pp. 2817-2823.

Li, Mu, et al., "Design of Highly Efficient Coal-Based Integrated Gasification Fuel Cell Power Plants," Journal of Power Sources, 2010, vol. 195, pp. 5707-5718.

Prins, M.J., et al., "Exergetic Optimisation of a Production Process of Fischer-Tropsch Fuels from Biomass," Fuel Processing Technology, 2005, vol. 86, No. 4, pp. 375-389.

Hydromethanation Process, GreatPoint Energy, Inc., from World Wide Web <http://greatpointenergy.com/ourtechnology.php.> accessed Sep. 5, 2013.

Sigma-Aldrich "Particle Size Conversion Table" (2004); from World Wide Web <http:/www.sigmaaldrich.com/chemistry/learning-center/technical-library/particle-size-conversion.printerview.html>.

* cited by examiner

AGGLOMERATED PARTICULATE LOW-RANK COAL FEEDSTOCK AND USES THEREOF

CROSS-REFERENCE TO RELATED APPLICATIONS

This application claims priority under 35 U.S.C. §119 from U.S. Provisional Application Ser. Nos. 61/708,104 (filed 1 Oct. 2012) and 61/775,771 (filed 11 Mar. 2013), the disclosures of which are incorporated by reference herein for all purposes as if fully set forth.

This application is related to U.S. application Ser. No. 14/039,402, entitled AGGLOMERATED PARTICULATE LOW-RANK COAL FEEDSTOCK AND USES THEREOF), U.S. application Ser. No. 14/039,454, entitled AGGLOMERATED PARTICULATE LOW-RANK COAL FEEDSTOCK AND USES THEREOF), and U.S. application Ser. No. 14/040,058, entitled USE OF CONTAMINATED LOW-RANK COAL FOR COMBUSTION), all of which are concurrently filed herewith and incorporated by reference herein for all purposes as if fully set forth.

FIELD OF THE INVENTION

The present invention relates generally to processes for preparing agglomerated particulate low-rank coal feedstocks of a particle size suitable for reaction in a fluidized-bed reactor and certain other gasification reactors and, in particular, for coal gasification and combustion applications. The present invention also relates to integrated coal gasification and combustion processes including preparing and utilizing such agglomerated particulate low-rank coal feedstocks.

BACKGROUND OF THE INVENTION

In view of numerous factors such as higher energy prices and environmental concerns, the production of value-added products (such as pipeline-quality substitute natural gas, hydrogen, methanol, higher hydrocarbons, ammonia and electrical power) from lower-fuel-value carbonaceous feedstocks (such as petroleum coke, resids, asphaltenes, coal and biomass) is receiving renewed attention.

Such lower-fuel-value carbonaceous feedstocks can be gasified at elevated temperatures and pressures to produce a synthesis gas stream that can subsequently be converted to such value-added products.

"Conventional" gasification processes, such as those based on partial combustion/oxidation and/or steam gasification of a carbon source at elevated temperatures and pressures (thermal gasification), generate syngas (carbon monoxide+hydrogen, lower BTU synthesis gas stream) as the primary product (little or no methane is directly produced). The syngas can be directly combusted for heat energy, and/or can be further processed to produce methane (via catalytic methanation, see reaction (III) below), hydrogen (via water-gas shift, see reaction (II) below) and/or any number of other higher hydrocarbon products.

One advantageous gasification process is hydromethanation, in which the carbonaceous feedstock is converted in a fluidized-bed hydromethanation reactor in the presence of a catalyst source, syngas (carbon monoxide and hydrogen) and steam at moderately-elevated temperatures and pressures to directly produce a methane-enriched synthesis gas stream (medium BTU synthesis gas stream) raw product, which can then also be directly combusted, further processed to enrich the methane content, used to produce hydrogen and/or used to produce any number of other hydrocarbon products.

Such lower-fuel-value carbonaceous feedstocks can alternatively be directly combusted for their heat value, typically for generating steam and electrical energy (directly or indirectly via generated steam).

In the above uses, the raw particulate feedstocks are typically processed by at least grinding to a specified particle size profile (including upper and lower end as well as dp(50) of a particle size distribution) suitable for the particular fluidized-bed or other gasification operation. Typically particle size profiles will depend on the type of bed, fluidization conditions (in the case of fluidized beds, such as fluidizing medium and velocity) and other conditions such as feedstock composition and reactivity, feedstock physical properties (such as density and surface area), reactor pressure and temperature, reactor configuration (such as geometry and internals), and a variety of other factors generally recognized by those of ordinary skill in the relevant art.

"Low-rank" coals are typically softer, friable materials with a dull, earthy appearance. They are characterized by relatively higher moisture levels and relatively lower carbon content, and therefore a lower energy content. Examples of low-rank coals include peat, lignite and sub-bituminous coals. Examples of "high-rank" coals include bituminous and anthracite coals.

In addition to their relatively low heating values, the use of low-ranks coals has other drawbacks. For example, the friability of such coals can lead to high fines losses in the feedstock preparation (grinding and other processing) and in the gasification/combustion of such coals. Such fines must be managed or even disposed of, which usually means an economic and efficiency disadvantage (economic and processing disincentive) to the use of such coals. For very highly friable coals such as lignite, such fines losses can approach or even exceed 50% of the original material. In other words, the processing and use of low-rank coals can result in a loss (or less desired use) of a material percentage of the carbon content in the low-rank coal as mined.

It would, therefore, be desirable to find a way to efficiently process low-rank coals to reduce fines losses in both the feedstock processing and ultimate conversion of such low-rank coal materials in various gasification and combustion processes.

Low-rank coals that contain significant amounts of impurities, such as sodium and chlorine (e.g., NaCl), may actually be unusable in gasification/combustion processes due to the highly corrosive and fouling nature of such components, thus requiring pretreatment to remove such impurities. Typically the addition of such a pretreatment renders the use of sodium and/or chlorine contaminated low-rank coals economically unfeasible.

It would, therefore, be desirable to find a way to more efficiently pretreat these contaminated low-rank coals to removed a substantial portion of at least the inorganic sodium and/or chlorine content.

Low-rank coals may also have elevated ash levels, and thus lower useable carbon content per unit raw feedstock.

It would, therefore, be desirable to find a way to more efficiently pretreat these low-rank coals to reduce overall ash content.

Also, low-ranks coals tend to have lower bulk density and more variability in individual particle density than high-rank coals, which can create challenges for designing and operating gasification and combustion processes.

It would, therefore, be desirable to find a way to increase both particle density and particle density consistency of low-rank coals, to ultimately improve the operability of processes that utilize such low-rank coals.

SUMMARY OF THE INVENTION

In a first aspect, the invention provides a process for preparing a free-flowing agglomerated particulate low-rank coal feedstock of a specified particle size distribution, the process comprising the steps of:

(a) selecting a specification for the particle size distribution of the free-flowing agglomerated particulate low-rank coal feedstock, the specification comprising
  (i) a target dp(50) that is a value in the range of from about 100 microns to about 6000 microns,
  (ii) a target upper end particle size that is a value greater than the target dp(50), and
  (iii) a target lower end particle size that is a value less than the target dp(50);
(b) providing a raw particulate low-rank coal feedstock having an initial particle density;
(c) grinding the raw particulate low-rank coal feedstock to a ground dp(50) of from about 2% to about 50% of the target dp(50), to generate a ground low-rank coal feedstock;
(d) pelletizing the ground low-rank coal feedstock with water and a binder to generate free-flowing agglomerated low-rank coal particles having a pelletized dp(50) of from about 90% to about 110% of the target dp(50), and a particle density of at least about 5% greater than the initial particle density, wherein the binder is selected from the group consisting of a water-soluble binder, a water-dispersible binder and a mixture thereof; and
(e) removing all or a portion of
  (i) particles larger than the upper end particle size,
  (ii) particles smaller than the lower end particle size, or
  (iii) both (i) and (ii),
from the free-flowing agglomerated low-rank coal particles to generate the free-flowing agglomerated low-rank coal feedstock.

In a second aspect, the present invention provides a process for gasifying a low-rank coal feedstock to a raw synthesis gas stream comprising carbon monoxide and hydrogen, the process comprising the steps of:

(A) preparing a low-rank coal feedstock of a specified particle size distribution;
(B) feeding into a fluidized-bed gasifying reactor
  (i) low-rank coal feedstock prepared in step (A), and
  (ii) a gas stream comprising one or both of steam and oxygen;
(C) reacting low-rank coal feedstock fed into gasifying reactor in step (B), at elevated temperature and pressure, with the gas stream, to generate a raw gas comprising carbon monoxide and hydrogen; and
(D) removing a stream of the raw gas generated in the gasifying reactor in step (C) as the raw synthesis gas stream,
wherein the low-rank coal feedstock comprises a free-flowing agglomerate particulate low-rank coal feedstock, and step (A) comprises the steps of:

(a1) selecting a specification for the particle size distribution of the free-flowing agglomerated particulate low-rank coal feedstock, the specification comprising
  (i) a target dp(50), wherein the selected target dp(50) is a value in the range of from about 100 microns to about 6000 microns,
  (ii) a target upper end particle size, and
  (iii) a target lower end particle size;
(b1) providing a raw particulate low-rank coal feedstock having an initial particle density;
(c1) grinding the raw particulate low-rank coal feedstock to a ground dp(50) of from about 2% to about 50% of the target dp(50), to generate a ground low-rank coal feedstock;
(d1) pelletizing the ground low-rank coal feedstock with water and a binder to generate free-flowing agglomerated low-rank coal particles having a pelletized dp(50) of from about 90% to about 110% of the target dp(50), and a particle density of at least about 5% greater than the initial particle density, wherein the binder is selected from the group consisting of a water-soluble binder, a water-dispersible binder and a mixture thereof; and
(e1) removing all or a portion of
  (i) particles larger than the upper end particle size,
  (ii) particles smaller than the lower end particle size, or
  (iii) both (i) and (ii),
from the free-flowing agglomerated low-rank coal particles to generate the free-flowing agglomerated low-rank coal feedstock.

In a third aspect, the present invention provides a process for combusting a low-rank coal feedstock to generate heat energy, the process comprising the steps of:

(A1) preparing a low-rank coal feedstock of a specified particle size distribution;
(B1) feeding into a fluidized-bed combustor
  (i) low-rank coal feedstock prepared in step (A1), and
  (ii) oxygen;
(C1) combusting low-rank coal feedstock fed into the combustor in step (B1), at elevated temperature and pressure, with oxygen to generate a combustion gas comprising carbon dioxide and heat energy; and
(D1) recovering heat energy from the combustion gas,
wherein the low-rank coal feedstock comprises a free-flowing agglomerate particulate low-rank coal feedstock, and step (A1) comprises the steps of:

(a2) selecting a specification for the particle size distribution of the free-flowing agglomerated particulate low-rank coal feedstock, the specification comprising
  (i) a target dp(50), wherein the selected target dp(50) is a value in the range of from about 100 microns to about 6000 microns,
  (ii) a target upper end particle size, and
  (iii) a target lower end particle size;
(b2) providing a raw particulate low-rank coal feedstock having an initial particle density;
(c2) grinding the raw particulate low-rank coal feedstock to a ground dp(50) of from about 2% to about 50% of the target dp(50), to generate a ground low-rank coal feedstock;
(d2) pelletizing the ground low-rank coal feedstock with water and a binder to generate free-flowing agglomerated low-rank coal particles having a pelletized dp(50) of from about 90% to about 110% of the target dp(50), and a particle density of at least about 5% greater than the initial particle density, wherein the binder is selected from the group consisting of a water-soluble binder, a water-dispersible binder and a mixture thereof; and
(e2) removing all or a portion of
  (i) particles larger than the upper end particle size,
  (ii) particles smaller than the lower end particle size, or
  (iii) both (i) and (ii),
from the free-flowing agglomerated low-rank coal particles to generate the free-flowing agglomerated low-rank coal feedstock.

The processes in accordance with the present invention are useful, for example, for more efficiently producing higher-value products and by-products from various low-rank coal materials at a reduced capital and operating intensity, and greater overall process efficiency.

These and other embodiments, features and advantages of the present invention will be more readily understood by those of ordinary skill in the art from a reading of the following detailed description.

DETAILED DESCRIPTION

Figure 1:
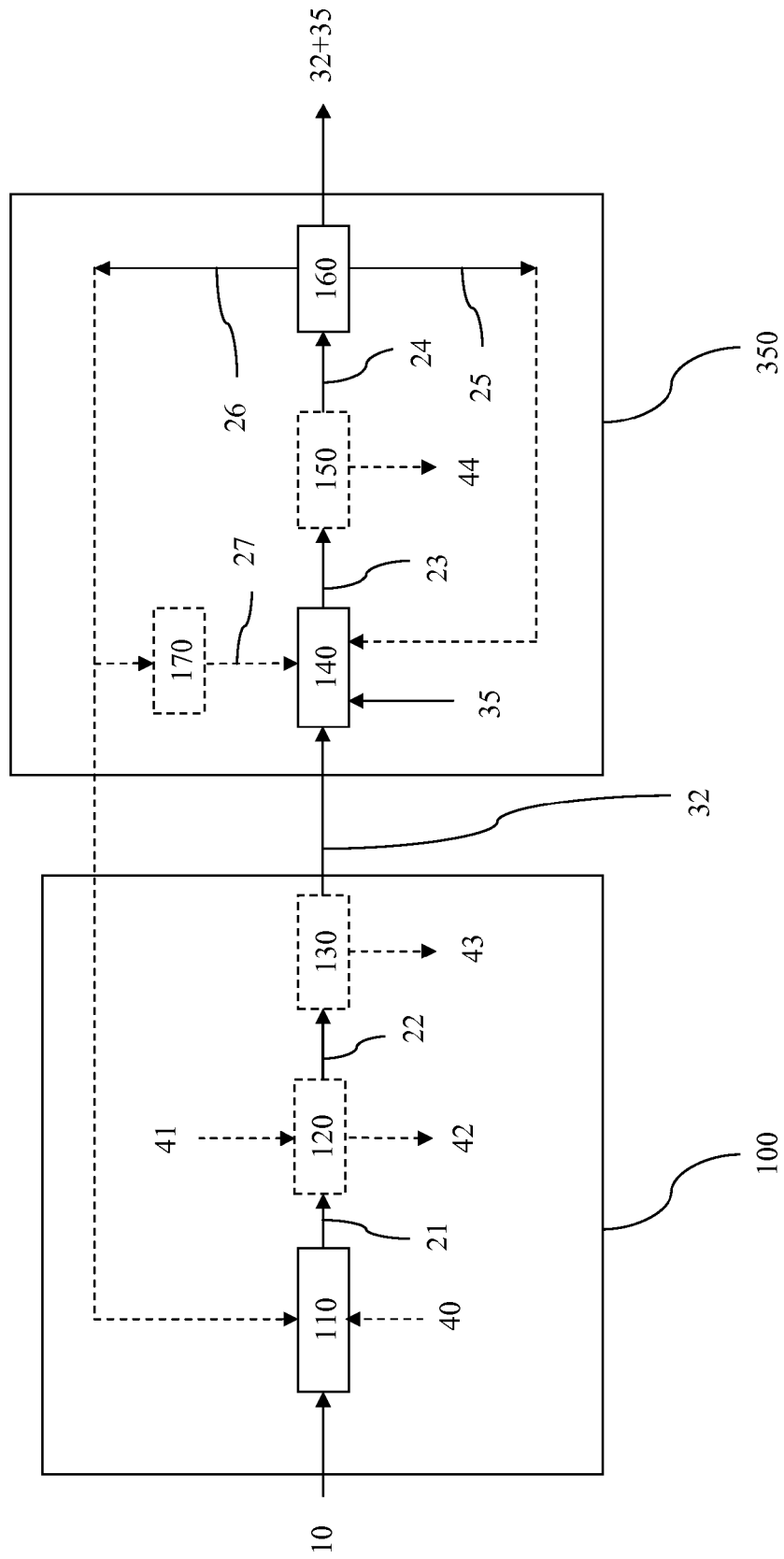
FIG. 1 is a general diagram of an embodiment of a process for preparing a free-flowing agglomerated particulate low-rank coal feedstock in accordance with the first aspect present invention.

The present invention relates to processes for preparing feedstocks from low-rank coals that are suitable for use in certain gasification and combustion processes, and for converting those feedstocks ultimately into one or more value-added products. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial", as used herein, unless otherwise defined herein, means that greater than about 90% of the referenced material, preferably greater than about 95% of the referenced material, and more preferably greater than about 97% of the referenced material. If not specified, the percent is on a molar basis when reference is made to a molecule (such as methane, carbon dioxide, carbon monoxide and hydrogen sulfide), and otherwise is on a weight basis (such as for carbon content).

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "depleted" is synonymous with reduced from originally present. For example, removing a substantial portion of a material from a stream would produce a material-depleted stream that is substantially depleted of that material. Conversely, the term "enriched" is synonymous with greater than originally present.

The term "carbonaceous" as used herein is synonymous with hydrocarbon.

The term "carbonaceous material" as used herein is a material containing organic hydrocarbon content. Carbonaceous materials can be classified as biomass or non-biomass materials as defined herein.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see US2009/0217575A1, US2009/0229182A1 and US2009/0217587A1.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and miscanthus (e.g., *Miscanthus* x *giganteus*). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues or mixtures thereof. For example, see US2009/0166588A1, US2009/0165379A1, US2009/0165380A1, US2009/0165361A1, US2009/0217590A1 and US2009/0217586A1.

"Liquid heavy hydrocarbon materials" are viscous liquid or semi-solid materials that are flowable at ambient conditions or can be made flowable at elevated temperature conditions. These materials are typically the residue from the processing of hydrocarbon materials such as crude oil. For example, the first step in the refining of crude oil is normally a distillation to separate the complex mixture of hydrocarbons into fractions of differing volatility. A typical first-step distillation requires heating at atmospheric pressure to vaporize as much of the hydrocarbon content as possible without exceeding an actual temperature of about 650° F. (about 343° C.), since higher temperatures may lead to thermal decomposition. The fraction which is not distilled at atmospheric pressure is commonly referred to as "atmospheric petroleum residue". The fraction may be further distilled under vacuum, such that an actual temperature of up to about 650° F. (about 343° C.) can vaporize even more material. The remaining undistillable liquid is referred to as "vacuum petroleum residue". Both atmospheric petroleum residue and vacuum petroleum residue are considered liquid heavy hydrocarbon materials for the purposes of the present invention.

Non-limiting examples of liquid heavy hydrocarbon materials include vacuum resids; atmospheric resids; heavy and reduced petroleum crude oils; pitch, asphalt and bitumen (naturally occurring as well as resulting from petroleum refining processes); tar sand oil; shale oil; bottoms from catalytic cracking processes; coal liquefaction bottoms; and other hydrocarbon feedstreams containing significant amounts of heavy or viscous materials such as petroleum wax fractions.

The term "asphaltene" as used herein is an aromatic carbonaceous solid at room temperature, and can be derived, for example, from the processing of crude oil and crude oil tar sands. Asphaltenes may also be considered liquid heavy hydrocarbon feedstocks.

The liquid heavy hydrocarbon materials may inherently contain minor amounts of solid carbonaceous materials, such as petroleum coke and/or solid asphaltenes, that are generally dispersed within the liquid heavy hydrocarbon matrix, and that remain solid at the elevated temperature conditions utilized as the feed conditions for the present process.

The terms "petroleum coke" and "petcoke" as used herein include both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil (such as a liquid petroleum residue), which petcoke contains ash as a minor component, typically about 1.0 wt % or less, and more typically about 0.5 wt % of less, based on the weight of the coke. Typically, the ash in such lower-ash cokes predominantly comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes predominantly comprises materials such as silica and/or alumina.

Petroleum coke can comprise at least about 70 wt % carbon, at least about 80 wt % carbon, or at least about 90 wt % carbon, based on the total weight of the petroleum coke. Typically, the petroleum coke comprises less than about 20 wt % inorganic compounds, based on the weight of the petroleum coke.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from combustion of a coal typically comprises both a fly ash and a bottom ash, as is familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material," Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium, U.S. Bureau of Mines, Information Circular No. 8640, Washington, D.C., 1973.

A material such as methane can be biomass or non-biomass under the above definitions depending on its source of origin.

A "non-gaseous" material is substantially a liquid, semi-solid, solid or mixture at ambient conditions. For example, coal, petcoke, asphaltene and liquid petroleum residue are non-gaseous materials, while methane and natural gas are gaseous materials.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a cyclone unit may comprise an internal cyclone followed in series by an external cyclone. As another example, a pelletizing unit unit may comprise a first pelletizer to pelletize to a first particle size/particle density, followed in series by a second pelletizer to pelletize to a second particle size/particle density.

The term "free-flowing" particles as used herein means that the particles do not materially agglomerate (for example, do not materially aggregate, cake or clump) due to moisture content, as is well understood by those of ordinary skill in the relevant art. Free-flowing particles need not be "dry" but, desirably, the moisture content of the particles is substantially internally contained so that there is minimal (or no) surface moisture.

The term "a portion of the carbonaceous feedstock" refers to carbon content of unreacted feedstock as well as partially reacted feedstock, as well as other components that may be derived in whole or part from the carbonaceous feedstock (such as carbon monoxide, hydrogen and methane). For example, "a portion of the carbonaceous feedstock" includes carbon content that may be present in by-product char and recycled fines, which char is ultimately derived from the original carbonaceous feedstock.

The term "superheated steam" in the context of the present invention refers to a steam stream that is non-condensing under the conditions utilized, as is commonly understood by persons of ordinary skill in the relevant art.

The term "dry saturated steam" or "dry steam" in the context of the present invention refers to slightly superheated saturated steam that is non-condensing, as is commonly understood by persons of ordinary skill in the relevant art.

The term "HGI" refers to the Hardgrove Grinding Index as measured in accordance with ASTM D409/D409M-11ae1.

The term "dp(50)" refers to the mean particle size of a particle size distribution as measured in accordance with ASTM D4749-87 (2007).

The term "particle density" refers to particle density as measured by mercury intrusion porosimetry in accordance with ASTM D4284-12.

When describing particles sizes, the use of "+" means greater than or equal to (e.g., approximate minimum), and the use of "−" means less than or equal to (e.g., approximate maximum).

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

General Feedstock Preparation Process Information

The present invention in part is directed to various processes for preparing free-flowing agglomerated particulate low-rank coal feedstocks suitable for fluidized-bed applications, including gasification and combustions processes, as well as certain other fixed/moving bed gasification processes.

Typically, the particle size distribution of such feedstocks for fluidized-bed uses will have a dp(50) that falls broadly within the range of from about 100 microns to about 6000 microns. Different processes will have their own more narrow ranges of particle size distributions, as discussed in more detail below.

The present invention provides in step (a) the setting of the desired final particle size distribution for the end use of the ultimate free-flowing agglomerated particulate low-rank coal feedstock, including the target dp(50), target upper end particle size (large or "bigs") and target lower end particle size (small or "fines"). Typically, the target upper end particle size should be at least 200%, or at least three 300%, and in some cases up to 1000%, of the target dp(50); and the target lower end particle size should be no greater than 50%, or no greater than 33%, and in some cases no less than 10%, of the target dp(50).

A person of ordinary skill in the relevant end-use art will readily be able to determine the desired particle size profile for the desired end use. For example, the desired particle size profile for certain gasification and combustion processes is detailed below.

In step (b) the raw particulate low-rank coal feedstock is provided.

The term "low-rank coal" is generally understood by those of ordinary skill in the relevant art. Low-rank coals include typical sub-bituminous coals, as well as lignites and peats. Low-ranks coals are generally considered to be "younger" coals than high-rank bituminous coal and anthracite, and tend to have lower particle density, higher porosity, lower fixed carbon content, higher moisture content, higher volatile content and, in many cases, higher inorganic ash content than such high rank coals.

In one embodiment, a raw "low-rank coal" has an inherent (total) moisture content of about 25 wt % or greater (as measured in accordance with ASTM D7582-10e1), a heating value of about 6500 kcal/kg (dry basis) or less (as measured in accordance with ASTM D5865-11a), and a fixed carbon content of about 45 wt % or less (as measured in accordance with ASTM D7582-10e1).

Typically, the raw low-rank particulate coal feedstocks will have an HGI of about 50 or greater. An embodiment of a low-rank coal for use in the present invention is a raw coal with an HGI of about 70 or greater, or from about 70 to about 130. In one embodiment, the low-rank coal is a lignite.

Typically, the raw particulate low-rank coal feedstock for use in the present processes will be substantially low-rank coal, or only low-rank coal. Mixtures of two or more different low-rank coals may also be used.

Mixtures of a predominant amount one or more low-rank coals with a minor amount of one or more other non-gaseous carbonaceous feedstocks may also be used as the raw particulate low-rank coal feedstock. Such other non-gaseous feedstocks include, for example, high-rank coals, petroleum coke, liquid petroleum residues, asphaltenes and biomass. In the event of a combination of a low-rank coal with another type of non-gaseous carbonaceous material, to be considered a "raw particulate low-rank coal feedstock" for the purposes of the present invention, the heating value from the low-rank coal component must be the predominant portion of the combination. Expressed another way, the overall heating value of the raw particulate low-rank coal feedstock is greater than 50%, or greater than about 66%, or greater than about 75%, or greater than about 90%, from a low-rank coal source.

As discussed in more detail below, certain other non-gaseous carbonaceous materials may be added at various other steps in the process. For example, such materials may be used to assist in the pelletizing (binding) of the ground low-rank coal feedstock, such as liquid petroleum residues, asphaltenes and certain biomasses such as chicken manure.

The raw low-rank coal feedstock provided in step (b) is then processed by grinding to a small particle size, pelletizing to the desired end particle size and then a final sizing, an embodiment of which is depicted in FIG. 1.

In accordance with that embodiment, a raw particulate low-rank coal feedstock (10) is processed in a feedstock preparation unit (100) to generate a ground low-rank coal feedstock (32), which is combined with a binder (35), pelletized and finally sized in a pelletization unit (350), to generate the free-flowing agglomerated low-rank coal feedstock (32+35) in accordance with the present invention.

Feedstock preparation unit (100) utilizes a grinding step, and may utilize other optional operations including but not limited to a washing step to remove certain impurities from the ground low-rank, and a dewatering step to adjust the water content for subsequent pelletization.

In the grinding step, the raw low-rank coal feedstock (10) can be crushed, ground and/or pulverized in a grinding unit (110) according to any methods known in the art, such as impact crushing and wet or dry grinding to yield a raw ground low-rank coal feedstock (21) of a particle size suitable for subsequent pelletization, which is typically to dp(50) of from about 2%, or from about 5%, or from about 10%, up to about 50%, or to about 40%, or to about 33%, or to about 25%, of the ultimate target dp(50).

The particulate raw low-rank coal feedstock (10) as provided to the grinding step may be as taken directly from a mine or may be initially processed, for example, by a coarse crushing to a particle size sufficiently large to be more finely ground in the grinding step.

Unlike typical grinding processes, the ground low-rank coal feedstock (21) is not sized directly after grinding to remove fines, but is used as ground for subsequent pelletization. In other words, in accordance with the present invention, the raw particulate low-rank coal feedstock (10) is completely ground down to a smaller particle size then reconstituted (agglomerated) up to the target particle size.

The present process thus utilizes substantially all (about 90 wt % or greater, or about 95 wt % or greater, or about 98 wt % or greater) of the carbon content of the particulate raw low-rank coal feedstock (10), as opposed to separating out fine or coarse material that would otherwise need to be separately processed (or disposed of) in conventional grinding operations. In other words, the ultimate free-flowing agglomerated particulate low-rank coal feedstock contains about 90 wt % or greater, or about 95 wt % or greater, or about 98 wt % or greater, of the carbon content of the raw particulate low-rank coal feedstock (10), and there is virtually complete usage of the carbon content (heating value) of the particulate raw low-rank coal feedstock (10) brought into the process.

In one embodiment, the particulate raw low-rank coal feedstock (10) is wet ground by adding an aqueous medium (40) into the grinding process. Examples of suitable methods for wet grinding of coal feedstocks are well known to those of ordinary skilled in the relevant art.

In another embodiment, an acid is added in the wet grinding process in order to break down at least a portion of the inorganic ash that may be present in the particulate raw low-rank coal feedstock (10), rendering those inorganic ash components water-soluble so that they can be removed in a subsequent wash stage (as discussed below). Suitable acids include hydrochloric acid, sulfuric acid and nitric acid, and are typically utilized in minor amounts sufficient to lower the pH of the aqueous grinding media to a point where the detrimental ash components will at least partially dissolve.

The raw ground low-rank coal feedstock (21) may then optionally be sent to a washing unit (120) where it is contacted with an aqueous medium (41) to remove various water-soluble contaminants, which are withdrawn as a wastewater stream (42), and generate a washed ground low-rank coal feedstock (22). The washing step is particularly useful for treating coals contaminated with inorganic sodium and inorganic chlorine (for example, with high NaCl content), as both sodium and chlorine are highly detrimental contaminants in gasification and combustion processes, as well as removing ash constituents that may have been rendered water soluble via the optional acid treatment in the grinding stage (as discussed above).

Examples of suitable coal washing processes are well known to those of ordinary skill in the relevant art. One such process involves utilizing one or a series of vacuum belt filters, where the ground coal is transported on a vacuum belt while it is sprayed with an aqueous medium, typically recycle water recovered from the treatment of wastewater streams from the process (for example, wastewater stream (42)). Additives such as surfactants, flocculants and pelletizing aids can also be applied at this stage. For example, surfactants and flocculants can be applied to assist in dewatering in the vacuum belt filters and/or any subsequent dewatering stages.

The resulting washed ground low-rank coal feedstock (22) will typically be in the form of a wet filter cake or concentrated slurry with a water content that will typically require an additional dewatering stage (dewatering unit (130)) to remove a portion of the water content and generate a ground low-rank coal feedstock (32) having a water content suitable for the subsequent pelletization in pelletization unit (350).

Methods and equipment suitable for dewatering wet coal filter cakes and concentrated coal slurries in this dewatering stage are well-known to those of ordinary skill in the relevant art and include, for example, filtration (gravity or vacuum), centrifugation, fluid press and thermal drying (hot air and/or steam) methods and equipment. Hydrophobic organic compounds and solvents having an affinity for the coal particles can be used to promote dewatering.

A wastewater steam (43) generated from the dewatering stage can, for example, be recycled to washing unit (120) and/or sent for wastewater treatment. Any water recovered from treatment of wastewater stream (43) can be recycled for use elsewhere in the process.

The result from feedstock preparation unit (100) is a ground low-rank coal feedstock (32) of an appropriate particle size and moisture content suitable for pelletization and further processing in pelletization unit (350).

Additional fines materials of appropriate particle size from other sources (not depicted) can be added into the feedstock preparation unit (100) at various places, and/or combined with ground low-rank coal feedstock (32). For example, fines materials from other coal and/or petcoke processing operations can be combined with ground low-rank coal feedstock (32) to modify (e.g., further reduce) the water content of ground low-rank coal feedstock (32) and/or increase the carbon content of the same.

Pelletization unit (350) utilizes a pelletizing step and a final sizing step, and may utilize other optional operations including but not limited to a dewatering step to adjust the water content for ultimate use.

Pelletizing step utilizes a pelletizing unit (140) to agglomerate the ground low-rank coal feedstock (32) in an aqueous environment with the aid of a binder (35) that is water-soluble or water-dispersible. The agglomeration is mechanically performed by any one or combination of pelletizers well known to those of ordinary skill in the relevant art. Examples of such pelletizers include pin mixers, disc pelletizers and drum pelletizers. In one embodiment, the pelletization is a two-stage pelletization performed by a first type of pelletizer followed in series by a second type of pelletizer, for example a pin mixer followed by a disc and/or drum pelletizer, which combination allows better control of ultimate particle size and densification of the agglomerated low-rank coal particles.

Suitable binders are also well-known to those of ordinary skill in the relevant art and include organic and inorganic binders. Organic binders include, for example, various starches, flocculants, natural and synthetic polymers, biomass such as chicken manure, and dispersed/emulsified oil materials such as a dispersed liquid petroleum resid.

Inorganic binders include mineral binders. In one embodiment, the binder material is an alkali metal which is provided as an alkali metal compound, and particularly a potassium compound such as potassium hydroxide and/or potassium carbonate, which is particularly useful in a catalytic steam gasification as the alkali metal serves as the catalyst for those reactions (discussed below). In those catalytic steam gasification processes where the alkali metal catalyst is recovered and recycled, the binder can comprise recycled alkali metal compounds along with makeup catalyst as required.

The pelletizing step should result in wet agglomerated low-rank coal particles (23) having a dp(50) as close to the target dp(50) as possible, but generally at least in the range of from about 90% to about 110% of the target dp(50). Desirably the wet agglomerated low-rank coal particles (23) have a dp(50) in the range of from about 95% to about 105% of the target dp(50).

Depending on the moisture content of the wet agglomerated low-rank coal particles (23), those particles may or may not be free flowing, and/or may not be structurally stable, and/or may have too high a moisture content for the desired end use, and may optionally need to go through an additional dewatering stage in a dewatering unit (150) to generate a dewatered agglomerated low-rank coal feedstock (24). Methods suitable for dewatering the wet agglomerated low-rank coal particles (32) in dewatering stage are well-known to those of ordinary skill in the relevant art and include, for example, filtration (gravity or vacuum), centrifugation, fluid press and thermal drying (hot air and/or steam). In one embodiment, the wet agglomerated low-rank coal particles (23) are thermally dried, desirably with dry or superheated steam.

A wastewater steam (44) generated from the dewatering stage can, for example, be recycled to pelletizing step (140) (along with binder (35)) and/or sent for wastewater treatment. Any water recovered from treatment of wastewater stream (44) can be recycled for use elsewhere in the process.

The pelletization unit (350) includes a final sizing stage in a sizing unit (160), where all or a portion of particles above a target upper end size (large or "bigs") and below a target lower end particle size (fines or "smalls") are removed to result in the free-flowing agglomerated low-rank coal feedstock (32+35). Methods suitable for sizing are generally known to those of ordinary skill in the relevant art, and typically include screening units with appropriately sized screens. In one embodiment, at least 90 wt %, or at least 95 wt %, of either or both (desirably) of the bigs and smalls are removed in this final sizing stage.

In order to maximize carbon usage and minimize waste, the particles above the target upper end size are desirably recovered as stream (26) and recycled directly back to grinding unit (110), and/or may be ground in a separate grinding unit (170) to generate a ground bigs stream (27) which can be recycled directly back into pelletizing unit (140). Likewise, the particles below the target lower end size are desirably recovered as stream (25) and recycled directly back to pelletizing unit (140).

Other than any thermal drying, all operations in the feedstock preparation stage generally take place under ambient temperature and pressure conditions. In one embodiment, however, the washing stage can take place under elevated temperature conditions (for example, using heated wash water) to promote dissolution of contaminants being removed during the washing process.

The resulting free-flowing agglomerated low-rank coal feedstock (32+35) will advantageously have increased particle density as compared to the initial particle density of the raw particulate low rank feedstock. The resulting particle density should be at least about 5% greater, or at least about 10% greater, than the initial particle density of the raw particulate low rank feedstock.

In one embodiment, the resulting free-flowing agglomerated low-rank coal feedstock has a target dp(50) which is a value in the range of from about 1000 microns to about 5000 microns.

In one embodiment, the resulting free-flowing agglomerated low-rank coal feedstock has a target dp(50) which is a value in the range of from about 3000 microns to about 6000 microns.

In one embodiment, the resulting free-flowing agglomerated low-rank coal feedstock has a target upper end particle size which is a value greater than the target dp(50), and less than or equal to 6350 microns.

In one embodiment, the resulting free-flowing agglomerated low-rank coal feedstock has a target lower end particle size which is a value less than the target dp(50), and greater than or equal to about 149 microns.

In one embodiment, the resulting free-flowing agglomerated low-rank coal feedstock has a target upper end particle size which is a value greater than the target dp(50), and less than or equal to 8000 microns.

In one embodiment, the resulting free-flowing agglomerated low-rank coal feedstock has a target lower end particle size which is a value less than the target dp(50), and greater than or equal to about 2000 microns.

In one embodiment, the resulting free-flowing agglomerated low-rank coal feedstock has a target dp(50) which is a value in the range of from about 100 microns to about 200 microns.

In one embodiment, the resulting free-flowing agglomerated low-rank coal feedstock has a target upper end particle size which is about 6350 microns or less; a target lower end particle size which is about 149 microns or greater; and about 90 wt % or greater of particles larger than the upper end particle size and particles smaller than the lower end particle size are removed from the free-flowing agglomerated low-rank coal particles to generate the free-flowing agglomerated low-rank coal feedstock.

Gasification and Combustion Processes

Processes that can utilize the agglomerated low-rank coal feedstocks in accordance with the present invention include, for example, various gasification and fluidized-bed combustion processes.

(1) Gasification

As a general concept, gasification processes convert the carbon in a carbonaceous feedstock to a raw synthesis gas stream that will generally contain carbon monoxide and hydrogen, and may also contain various amounts of methane and carbon dioxide depending on the particular gasification process. The raw synthesis gas stream may also contain other components such as unreacted steam, hydrogen sulfide, ammonia and other contaminants again depending on the particular gasification process, as well as any co-reactants and feedstocks utilized.

The raw synthesis gas stream is generated in a gasification reactor. Suitable gasification technologies are generally known to those of ordinary skill in the relevant art, and many applicable technologies are commercially available. Such gasification technologies typically utilize fluidized bed and fixed (moving) bed systems.

Non-limiting examples of different types of suitable gasification processes are discussed below. These may be used individually or in combination. All synthesis gas generation process will involve a reactor, which is generically depicted as (180) in FIG. 2, where the free-flowing agglomerated particulate low-rank coal feedstock will be reacted to produce the raw synthesis gas stream. General reference can be made to FIG. 2 in the context of the various synthesis gas generating processes described below.

Solids/Liquids-Based Gasification to Syngas

In one embodiment, the gasification process is based on a thermal gasification process, such as a partial oxidation gasification process where oxygen and/or steam is utilized as the oxidant, such as a steam gasification process.

Gasifiers potentially suitable for use in conjunction with the present invention are, in a general sense, known to those of ordinary skill in the relevant art and include, for example, those based on technologies available from Synthesis Energy Systems, Inc. (under the U-Gas trademark), Foster Wheeler Co., Uhde GmbH (under the HTW trademark) and others.

Figure 2:
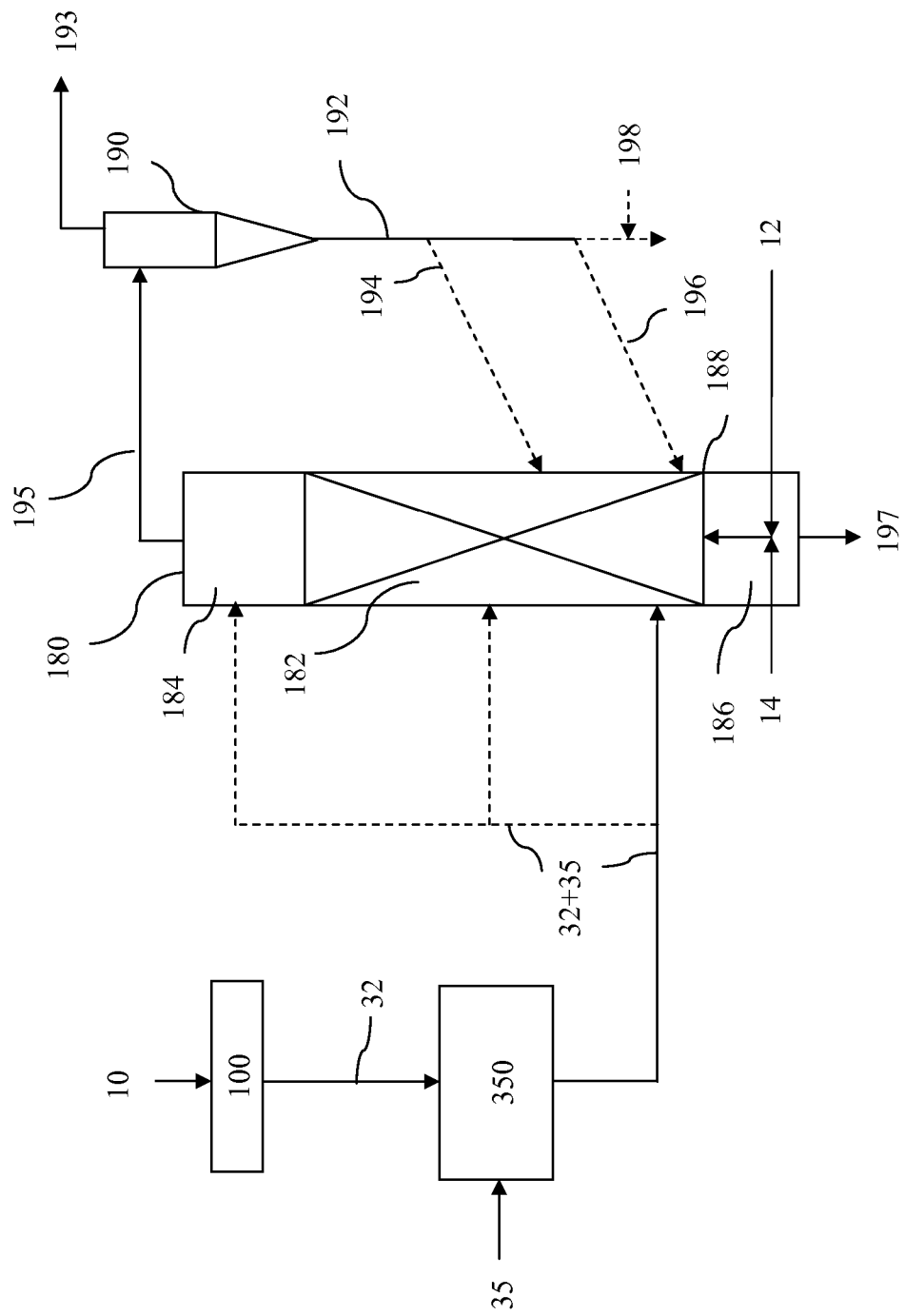
FIG. 2 is a general diagram of an embodiment of a gasification process in accordance with the present invention.

As applied to coal, and referring to FIG. 2, these processes convert an agglomerated particulate low-rank coal feedstock (32+35), in a reactor (180) such as an oxygen-blown gasifier or steam gasifier, into a syngas (hydrogen plus carbon monoxide) as a raw synthesis gas stream (195) which, depending on the specific process and carbonaceous feedstock, will have differing ratios of hydrogen:carbon monoxide, will generally contain minor amounts of carbon dioxide, and may contain minor amounts of other gaseous components such as methane, steam, hydrogen sulfide, sulfur oxides and nitrogen oxides.

Depending on the particular process, the agglomerated particulate low-rank coal feedstock (32+35) may be fed into reactor (180) at one or more different locations optimized for the particular gasification process, as will be recognized by a person of ordinary skill in the relevant art.

In certain of these processes, air or an oxygen-enriched gas stream (14) is fed into the reactor (180) along with the agglomerated feedstock (32+35). Optionally, steam (12) may also be fed into the reactor (180), as well as other gases such as carbon dioxide, hydrogen, methane and/or nitrogen.

In certain of these processes, steam (12) may be utilized as an oxidant at elevated temperatures in place of all or a part of the air or oxygen-enrich gas stream (14).

The gasification in the reactor (180) will typically occur in a bed (182) of the agglomerated feedstock (32+35) that is fluidized by the flow of the air or oxygen-enrich gas stream (14), steam (12) and/or other fluidizing gases (like carbon dioxide and/or nitrogen) that may be fed to reactor (180).

Typically, thermal gasification is a non-catalytic process, so no gasification catalyst needs to be added to the agglomerated feedstock (32+35) or into the reactor (180); however, a catalyst that promotes syngas formation may be utilized.

Typically, carbon conversion is very high in thermal gasification processes, and any residual residues are predominantly inorganic ash with little or no carbon residue. Depending on reaction conditions, thermal gasification may be slagging or non-slagging, where a residue (197) is withdrawn from reactor (180) as a molten (slagging) or solid (non-slagging) ash or char (to the extent there is still appreciable carbon content in the residue). Typically the residue (197) is collected in a section (186) below bed (182) and a grid plate (188) and withdrawn from the bottom or reactor (180), but ash/char may also be withdrawn from the top (184) of reactor (180) along with raw synthesis gas stream (195).

The raw synthesis gas stream (195) is typically withdrawn from the top or upper portion of reactor (180).

The hot gas effluent leaving bed (182) of reactor (180) can pass through a fines remover unit (such as cyclone assembly (190)), incorporated into and/or external of reactor (180), which serves as a disengagement zone. Particles too heavy to be entrained by the gas leaving the reactor (180) can be returned to the reactor (180), for example, to bed (182).

Residual entrained fines are substantially removed by any suitable device such as internal and/or external cyclone separators (190) optionally followed by Venturi scrubbers to generate a fines-depleted raw product stream (193). At least a portion of these fines can be returned to bed (182) via recycle lines (192), (194) and/or (196), particularly to the extent that such fines still contain material carbon content (can be considered char). Alternatively, any fines or ash can be removed via lines (192) and (198).

A non-catalytic steam gasification process is disclosed, for example, in U.S. Pat. No. 3,971,639. A catalytic steam gasification process is disclosed, for example, in U.S. Pat. Nos. 3,958,957 and 4,541,841. A partial oxidation process is disclosed, for example, in U.S. Pat. No. 4,333,065.

These thermal gasification processes are typically operated under relatively high temperature and pressure conditions and, as indicated above, may run under slagging or non-slagging operating conditions depending on the process and carbonaceous feedstock.

For example, in a U-GAS® based gasification facility, a lock hopper system supplies the feed into the gasifier, where it is reacted with steam and air or oxygen in a fluidized-bed gasifier at temperatures of from about 840° C. to about 1100° C. The gasifier operating pressure depends largely on the product end use, ranging anywhere from about 50 psig (about 446 kPa) to about 450 psig (about 3204 kPa). Ultimate carbon conversion is high, typically 95% and higher, due to the reaction conditions. Suitable particle sizes include a dp(50) ranging from about 1000 microns to about 5000 microns, typically with a top size of about −6350 micron and less than 10% below a bottom size of +149 micron.

The Uhde HTW™ gasifier utilizes a fluidized bed that operates at a temperature of from about 800° C. to about 1100° C. and a pressure of from about 150 psig (1136 kPa) to about 600 psig (4238 kPa). Suitable particle sizes include a dp(50) ranging from about 3000 microns to about 6000 microns, or a range generally of from about +2000 microns to about −8000 microns.

Reaction and other operating conditions, and equipment and configurations, of the various reactors and technologies are in a general sense known to those of ordinary skill in the relevant art, and are not critical to the present invention in its broadest sense.

(2) Combustion Processes

As a general concept, in combustion processes the carbon in a carbonaceous feedstock is burned for heat which can be recovered, for example, to generate steam various industrial uses, and for exhaust gases that can be used to drive turbines for electricity generation.

Suitable fluidized-bed combustion technologies are generally known to those of ordinary skill in the relevant art, and many applicable technologies are commercially available.

On such technology utilizes a circulating fluidized-bed combustor ("CFB"). CFBs generally operate at moderate temperatures of from about 760° C. to about 930° C. CFBs utilize coarser particles having a dp(50) ranging from about 3000 microns to about 6000 microns.

Another technology utilizes a pulverized coal boiler ("PCB"). PCBs operate at high temperatures of from about 1300° C. to about 1700° C. PCBs utilize finer particles having a dp(50) ranging from about 100 to about 200 microns.

Fluidized-bed boilers can be operated at various pressures ranging from atmospheric to much higher pressure conditions, and typically use air for the fluidizing medium, which is typically enriched in oxygen to promote combustion.

Figure 3:
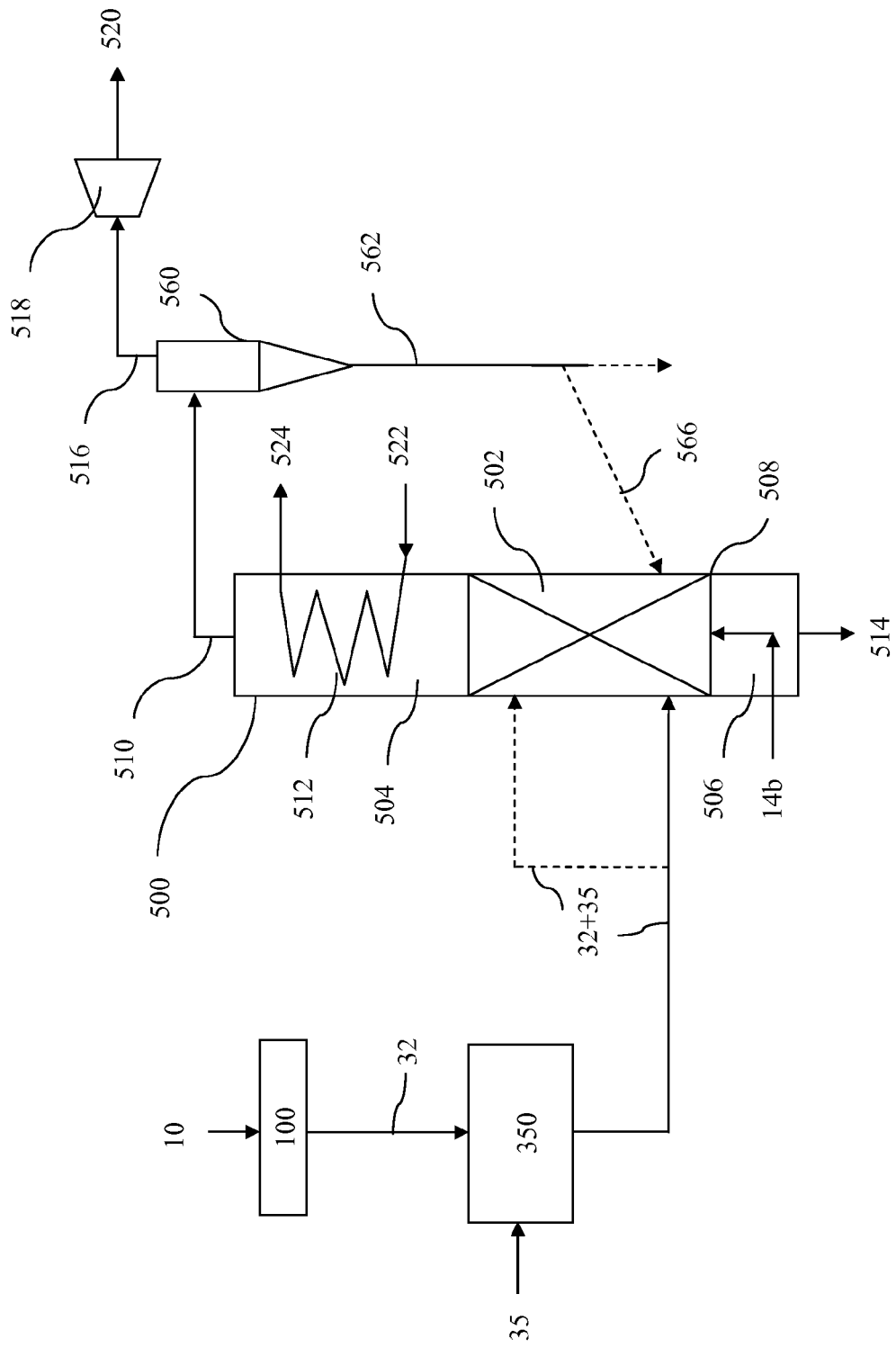
FIG. 3 is a general diagram of an embodiment of a combustion process in accordance with the present invention.

All fluidized-bed combustion process will involve a reactor, which is generically depicted as (500) in FIG. 3, where will be combusted to produce heat energy and an exhaust gas (510).

Referring to FIG. 3, the free-flowing agglomerated particulate low-rank coal feedstock (32+35) and an air or oxygen-enriched air stream (14b) is fed into a combustion reactor (500) containing a fluidized bed (502) in which the carbon is combusted to generate a combustion gas typically comprising carbon dioxide, water vapor, heat energy, entrained solids and other contaminant by-products depending on the coal composition and combustion conditions.

Depending on the particular process, the agglomerated particulate low-rank coal feedstock (32+35) may be fed into combustion reactor (500) at one or more different locations optimized for the particular combustion process, as will be recognized by a person of ordinary skill in the relevant art.

The combustion in combustion reactor (500) will typically occur in a bed (502) of the agglomerated feedstock (32+35) that is fluidized by the flow of the air or oxygen-enriched air stream (14b) and/or other fluidizing gases (like carbon dioxide and/or nitrogen) that may be fed to combustion reactor (500).

Typically, combustion is a non-catalytic process, so no catalyst needs to be added to the agglomerated feedstock (32+35) or into combustion reactor (500); however, a catalyst that promotes combustion may be utilized.

Typically, carbon conversion is substantially complete in combustion processes, and any residual solid residues are predominantly inorganic ash with little or no carbon residue. Depending on reaction conditions, combustion may be slagging or non-slagging, where a solid residue (514) is withdrawn from combustion reactor (500) as a molten (slagging) or solid (non-slagging) ash or char (to the extent there is still appreciable carbon content in the solid residue). Typically the residue is collected in a section (506) below bed (502) and withdrawn from the bottom of combustion reactor (500), but ash may also be withdrawn from the top (504) of combustion reactor (500) along with the raw combustion gas stream (510).

Section (506) and fluidized bed (502) can be separated, for example, by a grid plate (508).

The raw combustion gas stream (510) is typically withdrawn from the top or upper portion (504) of combustion reactor (500).

The hot gas effluent leaving bed (502) of combustion reactor (500) can pass through a fines remover unit (such as cyclone assembly (560)), incorporated into and/or external of combustion reactor (500), which serves as a disengagement zone. Particles too heavy to be entrained by the gas leaving combustion reactor (500) can be returned to combustion reactor (500), for example, to bed (502).

Residual entrained fines are substantially removed by any suitable device such as internal and/or external cyclone separators (560) to generate a fines-depleted raw combustion gas stream (516). At least a portion of these fines can be returned to bed (502) via recycle lines (562) and (566), particularly to the extent that such fines still contain material carbon content (can be considered char). Alternatively, any fines or ash can be removed via line (562).

If combustion reactor is operated under sufficient pressure conditions, the fines-depleted raw combustion gas stream (516) can be used to drive a turbine (518) for the generation of electricity. The exhaust gas (520) exiting turbine (518) can then be treated by known processes prior to discharge to the atmosphere.

Heat generated in combustion reactor (500) can be recovered via a heat exchanger (512) that can be used to generate steam from water, or superheat steam. For example, a low-pressure steam stream (522) can be passed through heat exchanger (512) where it is superheated to produce a high-pressure steam stream (524) that can be used for various industrial processes, including but not limited to driving a steam turbine for the generation of electricity.

Combustion and other operating conditions, and equipment and configurations, of the various reactors and technologies are in a general sense known to those of ordinary skill in the relevant art, and are not critical to the present invention in its broadest sense.

Multi-Train Processes

In the processes of the invention, each process may be performed in one or more processing units. For example, one or more gasification reactors may be supplied with the feedstock from one or more feedstock preparation unit operations. Similarly, the raw product streams generated by one or more gasification reactors may be processed or purified separately or via their combination at various downstream points depending on the particular system configuration.

In certain embodiments, the processes utilize two or more reactors (e.g., 2-4 gasification reactors). In such embodiments, the processes may contain divergent processing units (i.e., less than the total number of gasification reactors) prior to the reactors for ultimately providing the carbonaceous feedstock to the plurality of reactors, and/or convergent processing units (i.e., less than the total number of gasification reactors) following the reactors for processing the plurality of raw gas streams generated by the plurality of reactors.

When the systems contain convergent processing units, each of the convergent processing units can be selected to have a capacity to accept greater than a 1/n portion of the total feed stream to the convergent processing units, where n is the number of convergent processing units. Similarly, when the systems contain divergent processing units, each of the divergent processing units can be selected to have a capacity to accept greater than a 1/m portion of the total feed stream supplying the convergent processing units, where m is the number of divergent processing units.

We claim:

1. A process for preparing a free-flowing agglomerated particulate low-rank coal feedstock of a specified particle size distribution, the process comprising the steps of:
   (a) selecting a specification for the particle size distribution of the free-flowing agglomerated particulate low-rank coal feedstock, the specification comprising
      (i) a target dp(50) that is a value in the range of from about 100 microns to about 6000 microns,
      (ii) a target upper end particle size that is a value greater than the target dp(50), and
      (iii) a target lower end particle size that is a value less than the target dp(50);
   (b) providing a raw particulate low-rank coal feedstock having an initial particle density;
   (c) grinding the raw particulate low-rank coal feedstock to a ground dp(50) of from about 2% to about 50% of the target dp(50), to generate a ground low-rank coal feedstock;
   (d) pelletizing the ground low-rank coal feedstock with water and a binder to generate free-flowing agglomerated low-rank coal particles having a pelletized dp(50) of from about 90% to about 110% of the target dp(50), and a particle density of at least about 5% greater than the initial particle density, wherein the binder is selected from the group consisting of a water-soluble binder, a water-dispersible binder and a mixture thereof; and (e) removing all or a portion of
   (i) particles larger than the upper end particle size,
   (ii) particles smaller than the lower end particle size, or
   (iii) both (i) and (ii),
from the free-flowing agglomerated low-rank coal particles to generate the free-flowing agglomerated low-rank coal feedstock.

2. The process of claim 1, wherein about 90 wt % or greater of
   (i) particles larger than the upper end particle size, and
   (ii) particles smaller than the lower end particle size,
are removed from the free-flowing agglomerated low-rank coal particles to generate the free-flowing agglomerated low-rank coal feedstock.

3. The process of claim 1, wherein the raw low-rank particulate coal feedstock has a Hardgrove Grinding Index of about 50 or greater.

4. The process of claim 3, wherein the raw low-rank particulate coal feedstock has a Hardgrove Grinding Index of about 70 or greater.

5. The process of claim 4, wherein the raw low-rank particulate coal feedstock has a Hardgrove Grinding Index of from about 70 to about 130.

6. The process of claim 1, wherein the grinding step is a wet grinding step.

7. The process of claim 6, wherein an acid is added in the wet grinding step.

8. The process of claim 1, wherein the process further comprises the step of washing the raw ground low-rank coal feedstock from the grinding step to generate a washed ground low-rank coal feedstock.

9. The process of claim 8, wherein the raw ground low-rank coal feedstock is washed to remove one or both of inorganic sodium and inorganic chlorine.

10. The process of claim 8, wherein the washed ground low-rank coal has a water content, and the process further comprises the step of removing a portion of the water content from the washed ground low-rank coal feedstock to generate the ground low-rank coal feedstock for the pelletizing step.

11. The process of claim 1, wherein the binder comprises an alkali metal.

12. The process of claim 1, wherein the pelletization is a two-stage pelletization performed by a first type of pelletizer followed in series by a second type of pelletizer.

13. The process of claim 1, wherein the particle density of the free-flowing agglomerated low-rank coal particles is at least about 10% greater than the initial particle density.

14. The process of claim 1, wherein the raw particulate low-rank coal feedstock is ground to a ground dp(50) of from about 5% to about 50% of the target dp(50).

15. The process of claim 1, wherein the target dp(50) is a value in the range of from about 1000 microns to about 5000 microns.

16. The process of claim 15, wherein the target upper end particle size is a value greater than the target dp(50), and less than or equal to 6350 microns; and the target lower end particle size is a value less than the target dp(50), and greater than or equal to about 149 microns.

17. The process of claim 1, wherein the target dp(50) is a value in the range of from about 3000 microns to about 6000 microns.

18. The process of claim 17, wherein the target upper end particle size is a value greater than the target dp(50), and less than or equal to 8000 microns; and the target lower end particle size is a value less than the target dp(50), and greater than or equal to about 2000 microns.

19. The process of claim 1, wherein the target dp(50) is a value in the range of from about 100 microns to about 200 microns.

20. A process for gasifying a low-rank coal feedstock to a raw synthesis gas stream comprising carbon monoxide and hydrogen, the process comprising the steps of:
   (A) preparing a low-rank coal feedstock of a specified particle size distribution;
   (B) feeding into a fluidized-bed gasifying reactor
      (i) low-rank coal feedstock prepared in step (A), and
      (ii) a gas stream comprising one or both of steam and oxygen;
   (C) reacting low-rank coal feedstock fed into gasifying reactor in step (B), at elevated temperature and pressure, with the gas stream, to generate a raw gas comprising carbon monoxide and hydrogen; and
   (D) removing a stream of the raw gas generated in the gasifying reactor in step (C) as the raw synthesis gas stream,
wherein step (A) comprises the process as set forth in claim 1.

21. The process of claim 20, wherein step (A) comprises the process as set forth in claim 15.

22. The process of claim 20, wherein step (A) comprises the process as set forth in claim 16.

23. The process of claim 20, wherein step (A) comprises the process as set forth in claim 17.

24. The process of claim 20, wherein step (A) comprises the process as set forth in claim 18.

25. A process for combusting a low-rank coal feedstock to generate heat energy, the process comprising the steps of:
   (A1) preparing a low-rank coal feedstock of a specified particle size distribution;
   (B1) feeding into a fluidized-bed combustor
      (i) low-rank coal feedstock prepared in step (A1), and
      (ii) oxygen;
   (C1) combusting low-rank coal feedstock fed into the combustor in step (B1), at elevated temperature and pressure, with oxygen to generate a combustion gas comprising carbon dioxide and heat energy; and
   (D1) recovering heat energy from the combustion gas,
wherein step (A1) comprises the process as set forth in claim 1.

26. The process of claim 25, wherein step (A1) comprises the process as set forth in claim 17.

27. The process of claim 25, wherein step (A1) comprises the process as set forth in claim 19.

* * * * *